(12) United States Patent
Garrett et al.

(10) Patent No.: US 8,156,668 B2
(45) Date of Patent: Apr. 17, 2012

(54) FABRIC STRETCHING AND SOCKET ALIGNMENT TOOL AND METHOD

(75) Inventors: Marvin W Garrett, Richmond, VA (US); Leo M Moore, Chesterfield, VA (US)

(73) Assignee: Mutual Holdings, Inc., Richmond, VA (US)

( * ) Notice: Subject to any disclaimer, the term of this patent is extended or adjusted under 35 U.S.C. 154(b) by 813 days.

(21) Appl. No.: 12/208,611

(22) Filed: Sep. 11, 2008

(65) Prior Publication Data

US 2009/0071044 A1    Mar. 19, 2009

Related U.S. Application Data

(60) Provisional application No. 60/993,977, filed on Sep. 17, 2007.

(51) Int. Cl.
*D06C 3/00*    (2006.01)
*B25B 27/14*    (2006.01)
(52) U.S. Cl. ........................ 38/102.91; 29/271
(58) Field of Classification Search ............. 38/102, 38/102.91; 29/245, 273, 278, 271; 81/436, 81/177.1, 439, 447; 280/477; 160/385, 388–390, 160/403
See application file for complete search history.

(56) References Cited

U.S. PATENT DOCUMENTS

| | | | | | |
|---|---|---|---|---|---|
| 1,421,987 | A | * | 7/1922 | Quinn | 29/221.5 |
| 1,518,068 | A | * | 12/1924 | Horn | 29/247 |
| 1,999,206 | A | * | 4/1935 | Patterson | 29/273 |
| 3,102,318 | A | * | 9/1963 | Van Bruen, Jr. | 24/265 C |
| 3,849,012 | A | * | 11/1974 | Krouse | 403/188 |
| 3,918,140 | A | * | 11/1975 | Konstant | 29/271 |
| 4,278,119 | A | * | 7/1981 | Elmore | 81/490 |
| 4,694,550 | A | * | 9/1987 | Grove | 29/267 |
| 5,009,443 | A | * | 4/1991 | Howatt | 280/477 |
| 5,212,860 | A | * | 5/1993 | Lakey | 29/270 |
| 5,327,631 | A | * | 7/1994 | Lincavage | 29/271 |
| 5,479,692 | A | * | 1/1996 | Barkus | 29/468 |
| 5,984,837 | A | * | 11/1999 | Weaver et al. | 482/35 |
| 7,267,034 | B2 | * | 9/2007 | Hsieh | 81/177.2 |

* cited by examiner

*Primary Examiner* — Ismael Izaguirre
(74) *Attorney, Agent, or Firm* — Young & Thompson (57) ABSTRACT

A method and tool for stretching a fabric with a fastener eyelet socket to mate the fastener eyelet socket with a fastener stud, the method and tool aligning the socket with the stud for final fastening, the fabric stretching tool with a handle at one end and a shaft secured to the second end with a wedge-shaped tip located at a distal end of the shaft, a sloped surface defined on the wedge-shaped tip, and a semi-spherical concave cavity formed in the sloped surface of the wedge-shaped tip to mate with the fastener stud.

19 Claims, 15 Drawing Sheets

FABRIC STRETCHING AND SOCKET ALIGNMENT TOOL AND METHOD

BACKGROUND OF THE INVENTION

The present invention provides a fabric stretching and socket alignment tool and a method for fastening an eyelet socket of a fastener to a mating stud, while simultaneously stretching a fabric, to which the socket is attached, to align the socket with the stud for final fastening using the inventive tool.

DESCRIPTION OF THE RELATED ART

Figure 1:
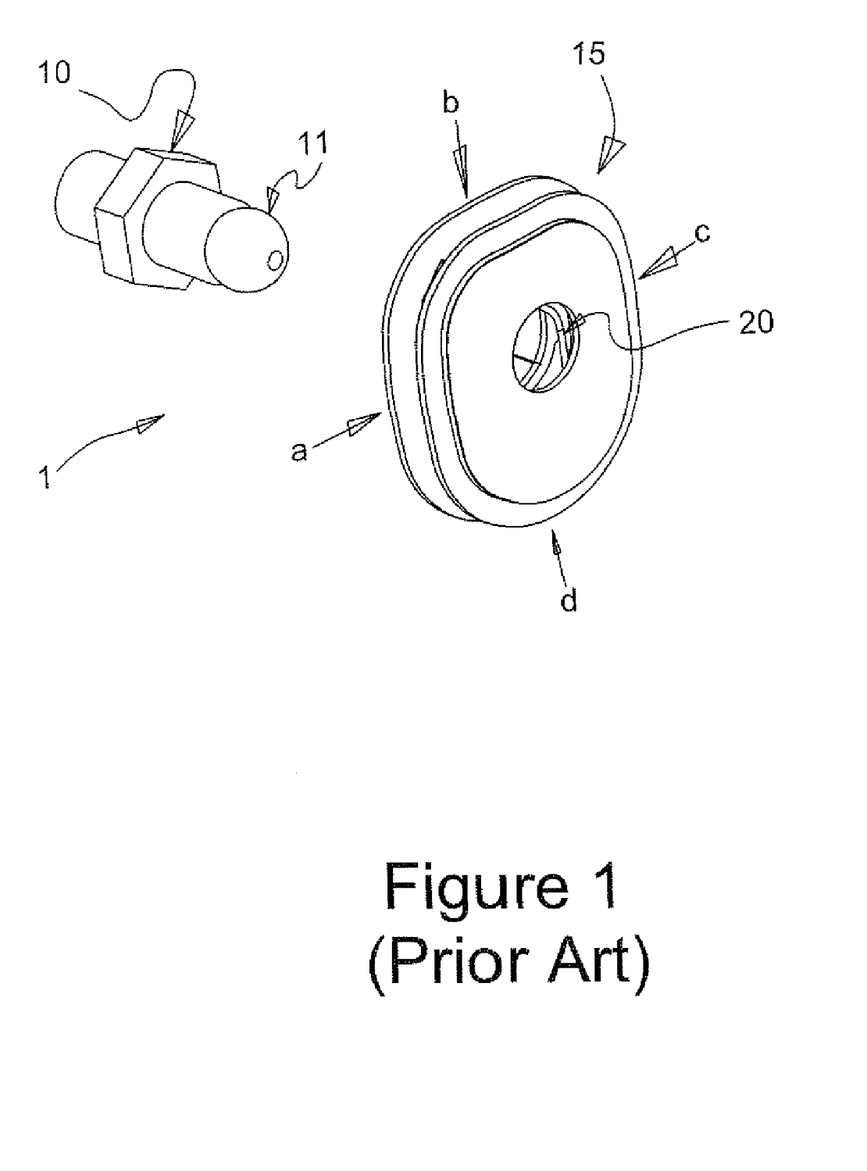
FIG. 1 illustrates a Lift the Dot® fastener.

FIG. 1 illustrates a fastener 1 comprising a stud 10 and a corresponding eyelet socket 15. The stud includes the convex spherical tip 11. The fastener, via tines 21 of retaining spring 20, locks around the stud 10 on three sides, labeled "a", "b", and "c" in FIG. 1. The fastener is opened by lifting a fourth side at a point labeled "d" in FIG. 1. An example of such a fastener is marketed under the name Lift the Dot®. Although the invention is described using the Lift the Dot® fastener, the invention finds application with other fasteners.

Such a fastener is commonly used on flexible windshields, boat covers, recreational vehicle covers, military equipment covers, etc. The stud is commonly mounted in a frame around the periphery of a window or opening.

The socket is commonly mounted in the fabric, e.g., canvas or vinyl, of the windshield, boat cover, recreational vehicle cover, military equipment cover, etc. To maintain optical clarity, flexible plastic windshields with such fasteners often require stretching to eliminate waviness or wrinkles in the transparent material. Wet canvas covers will often shrink after drying and require stretching as they are re-installed. Vinyl plastic composite fabric covers used on vehicles, boats and equipment transported over-the-road at highway speeds require taught covers to prevent flapping and fluttering in the wind. As these vinyl plastic composite covers are moved from a warm to a cold climate, thermal contraction of the vinyl plastic makes it very difficult to re-fasten the eyelet socket to the mating stud without a substantial amount of stretching force applied to the edge of the cover.

A prior art method of stretching the fabric with Lift the Dot® fasteners involves the use of locking pliers with wide flat jaws that grip the edge of the canvas while awkwardly applying a force "in line" with the plane of the cover. However, quite often the angle of the frame or cowling to which the fastener stud is attached makes it nearly impossible to use such pliers effectively.

SUMMARY OF THE INVENTION

The present invention solves the problem of stretching a fabric, whether canvas or otherwise, fitted with Lift the Dot® eyelet sockets while simultaneously aligning the eyelet socket with a mating Lift the Dot® stud for final fastening.

The present invention includes a tool comprising a handle connected to an attached cylindrical shaft, the shaft having a wedge-shaped tip, and a semi-spherical concave cavity formed into a sloped surface of the wedge-shaped tip.

BRIEF DESCRIPTION OF THE DRAWINGS

The present invention may be clearly understood by reference to the drawings in which.

DESCRIPTION OF THE PREFERRED EMBODIMENTS

The invention includes both the disclosed tool as well as a method of using the tool for fastening the eyelet socket portion 15 of a Lift the Dot® fastener 1, installed in a fabric 12 such as canvas, to a mating Lift the Dot® stud 10 while simultaneously stretching the fabric to align the socket 15 with the stud 10 for final fastening.

Figure 7:
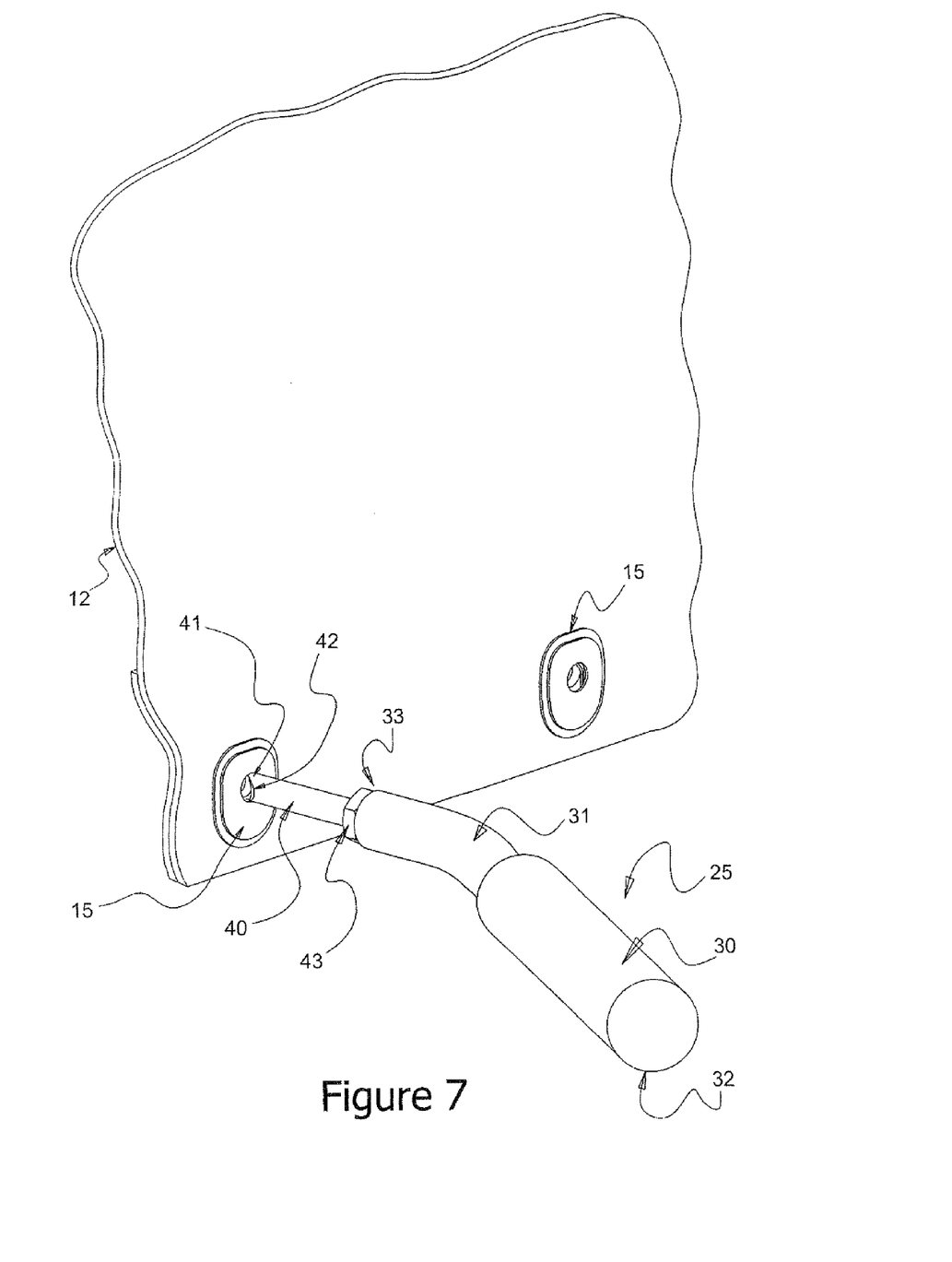
FIG. 7 is an isometric view of the inventive tool showing insertion of the tool tip into the eyelet socket, with a wedge plane parallel to a horizontal axis of the fastener.

FIG. 7 shows an isometric view of the tool 25 with a handle 30. The handle includes a first end 32 and a second end 33. In one embodiment the handle 30 is straight without any bends and thereby defining a straight handle 30. In the illustrated embodiment, the handle 30 includes a bend 31 of approximately 30 degrees near the second end 33 and thereby defining a bent handle 30.

The bent handle allows the tool to be used in and around tubular framing that might ordinarily interfere with the tool embodiment that incorporates a straight handle.

A cylindrical shaft 40 is attached at the second end 33. The attached cylindrical shaft 40 has a wedge-shaped tip 41 with a sloped surface 42. The shaft 40 may be attached to the second end 33 using a threaded section (not shown in this figure) with a jam nut 43 for locking the shaft 40 to the handle 30.

Releasing the jam nut 43 allows the shaft 40 to be removed and/or repositioned. This makes the tool versatile in that some fabric sections may have the Lift the Dot® eyelet socket 15 in the shadow of a tubular frame member or bracket requiring the jam nut 43 to be loosened and the sloped surface 42 of the wedge-shaped tip 41 oriented in order to mate properly with the spherical tip 11 of the Lift the Dot® stud 10.

The jam nut 43 may be of any appropriate form, e.g., a wingnut 46 (FIG. 9) or a nut free of wings, as also illustrated in the Figures.

Figure 8:
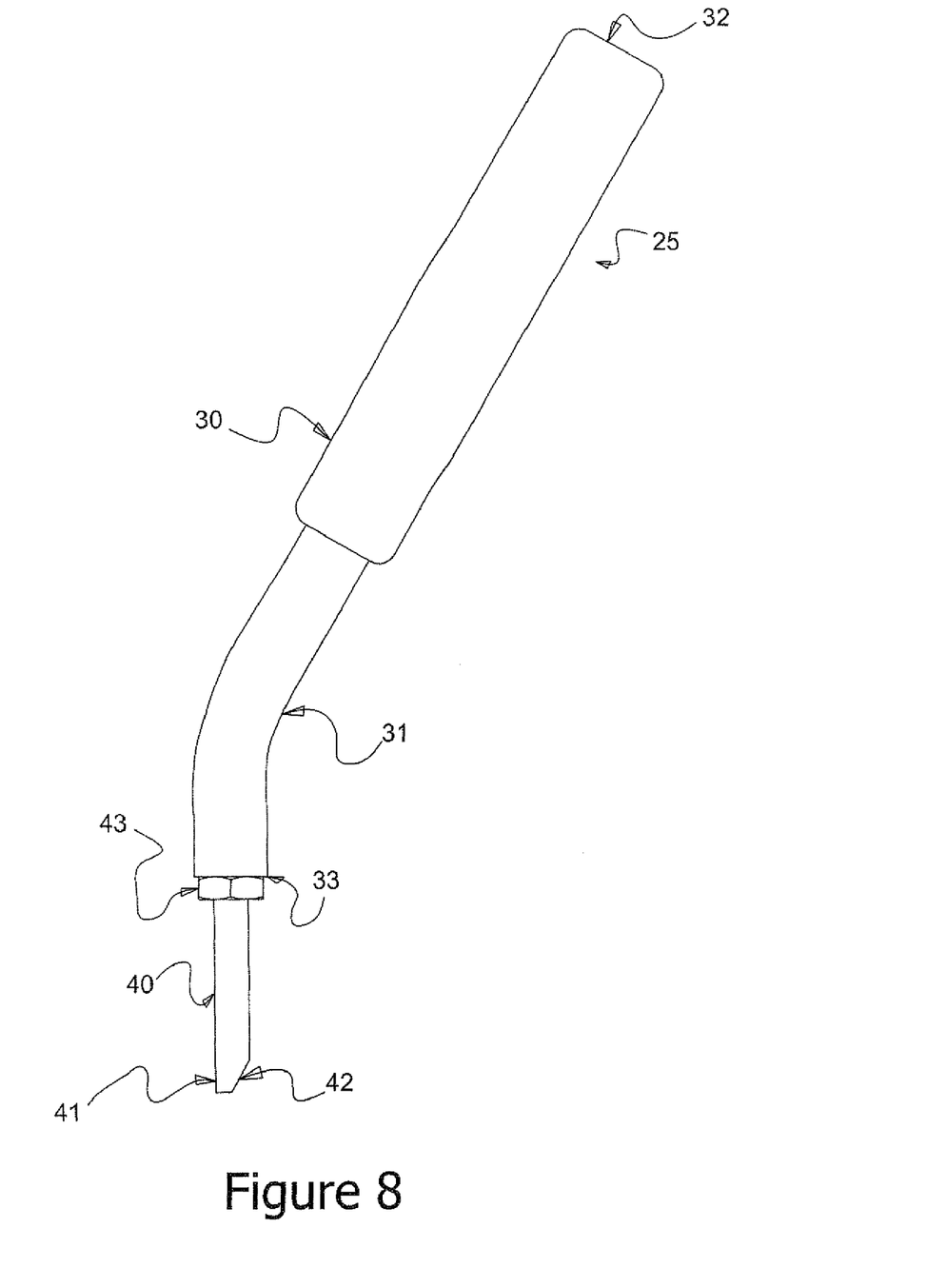
FIG. 8 is a side view of the inventive tool showing the handle with an attached wedge-tipped shaft.

FIG. 8 is a side view of the tool showing the handle with an attached cylindrical shaft 40.

Figure 9:
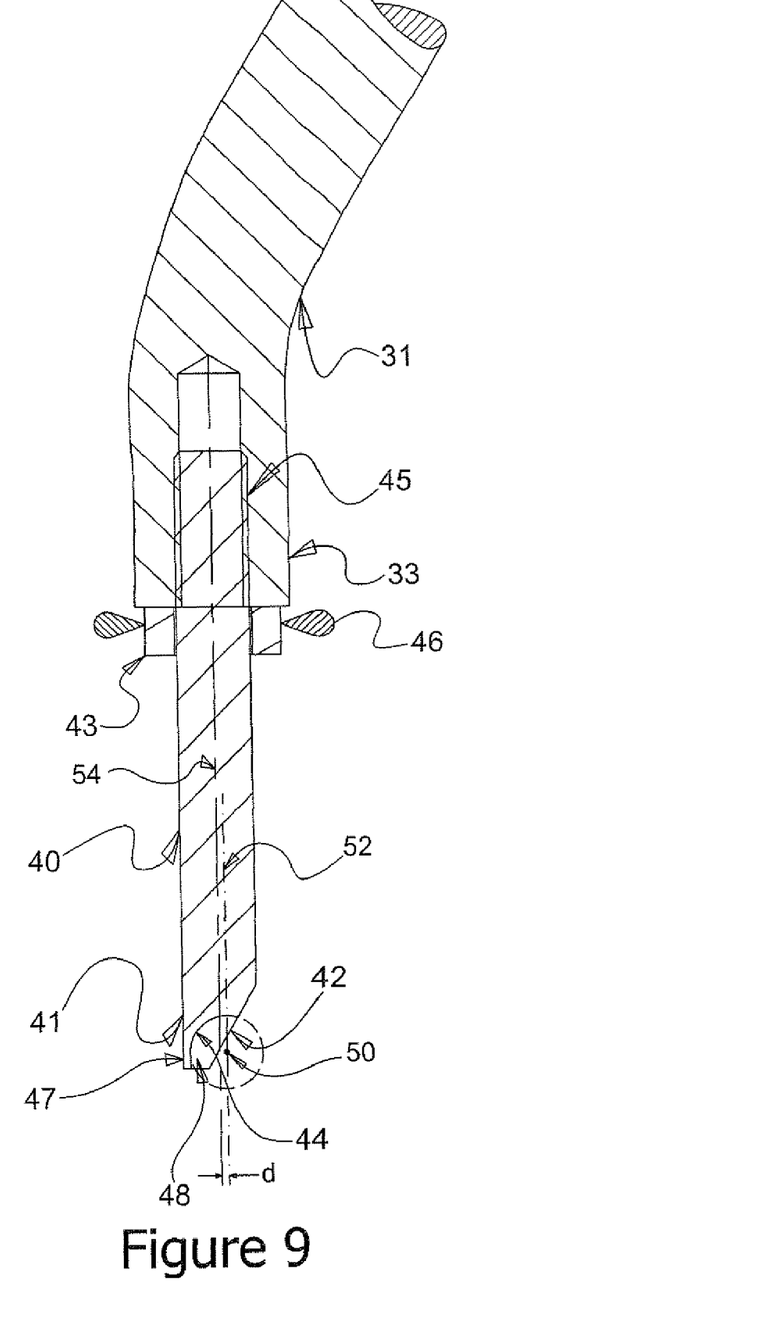
FIG. 9 is a cross section of the distal end of the inventive tool, the distal end showing a semi-spherical concave cavity formed in a sloped surface of the wedge-tipped shaft.

FIG. 9 is a cross section of the tool distal end showing the threaded section 45 and a cavity area 48 at opposite ends of the shaft 40. The cavity area 48 comprises at least a semi-spherical concave cavity 44 having a radial center 50 and formed in the sloped surface 42 of the wedge-shaped tip 41. The concave cavity 44 may be formed by milling. Additionally, the cavity area 48 comprises a cross-sectionally flat end portion 47 located at the distal end of the wedge-shaped tip 41 and adjoining a wall of the concave cavity 44. The end portion 47 of the wedge-shaped tip 41 provides a straight surface extending from a lower edge of the semi-spherical concave cavity 44 at the distal end of the wedge-shaped tip 41 in the direction of extension of the shaft 40. A vertical axis 52 through the radial center 50 is horizontally offset by a small distance d from the cylindrical axis 54 of the shaft 40 in the horizontal direction away from the end portion 47.

Figure 26:
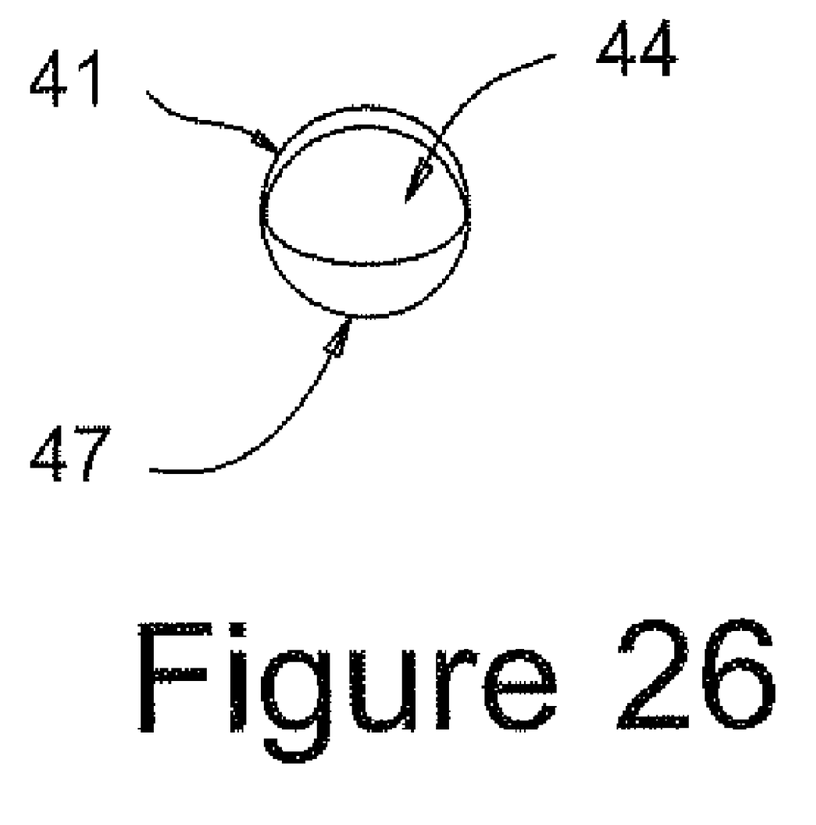
FIG. 26 illustrates the distal end of the wedge-shaped shaft in a plan view, showing a semi-spherical concave cavity formed in a sloped surface of the wedge-tipped shaft.

FIG. 26 is a plan view of the distal end of the wedge-shaped tip 41, showing the concave cavity 44 and the end portion 47.

The sloped surface 42 begins at a first side of the shaft 40 and angles in a direction into the shaft 40 toward an opposite second side at an angle of approximately 30 degrees relative to the first side. The sloped surface terminates at a point on a distal surface of the wedge shaped tip 41 which may be flat and perpendicular to the first and second sides of the shaft 40.

The diameter of the cavity 44 is less than the diameter of the spherical tip 11. In one embodiment the concave cavity 44 defines approximately 25% of a spherical volume. The small distance d is approximately 10% of the diameter of the cylindrical shaft 40.

Figures 2, 3:
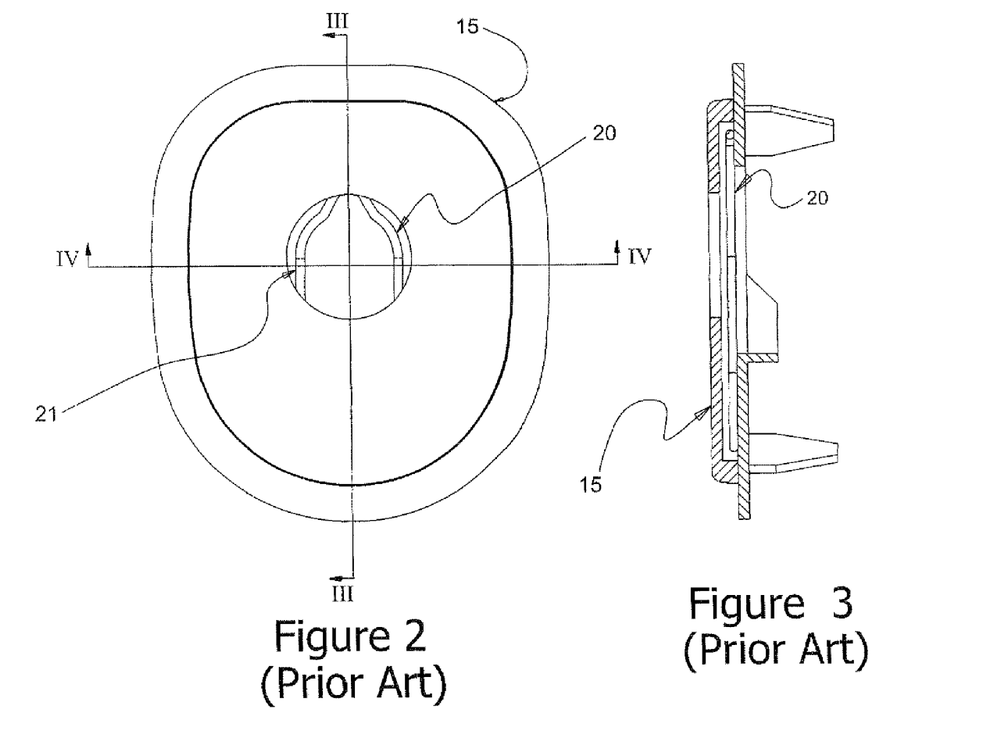
FIGS. 2-4 are a plan view and cross section views of the Lift the Dot® eyelet socket showing the fastener's retaining spring.
Figure 4:
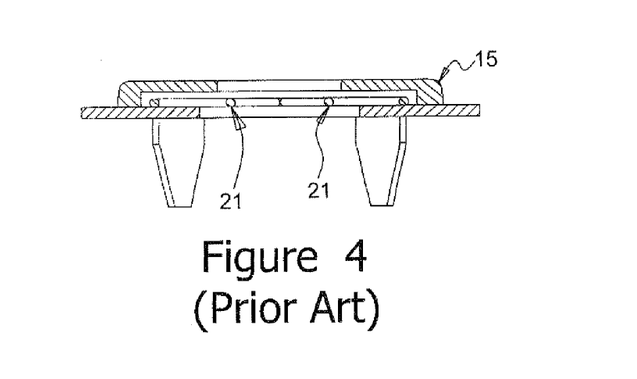
Figures 5, 6:
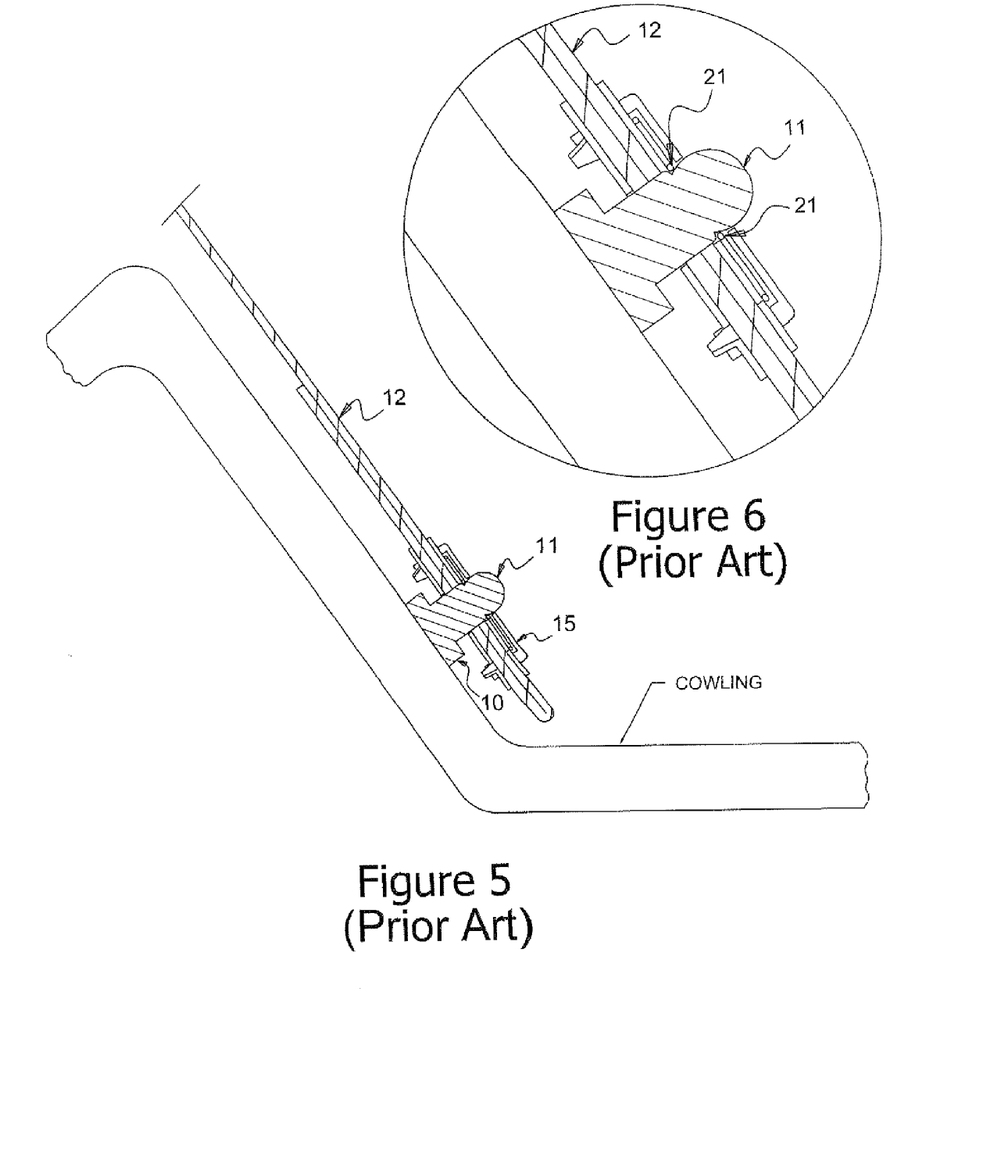
FIGS. 5-6 are a cross section of a Lift the Dot® eyelet socket installed in the edge of a canvas fabric with the eyelet socket fastened to a mating stud, and an enlargement thereof.

FIGS. 3-4 illustrate a cross section of the Lift the Dot® eyelet socket 15 showing the fastener's retaining spring 20. The tines 21 of the retaining spring 20 must be spread apart in order for the tool shaft 40 to be fully inserted into the Lift the Dot® eyelet socket 15. See FIGS. 13-15.

Figures 10, 11, 12:
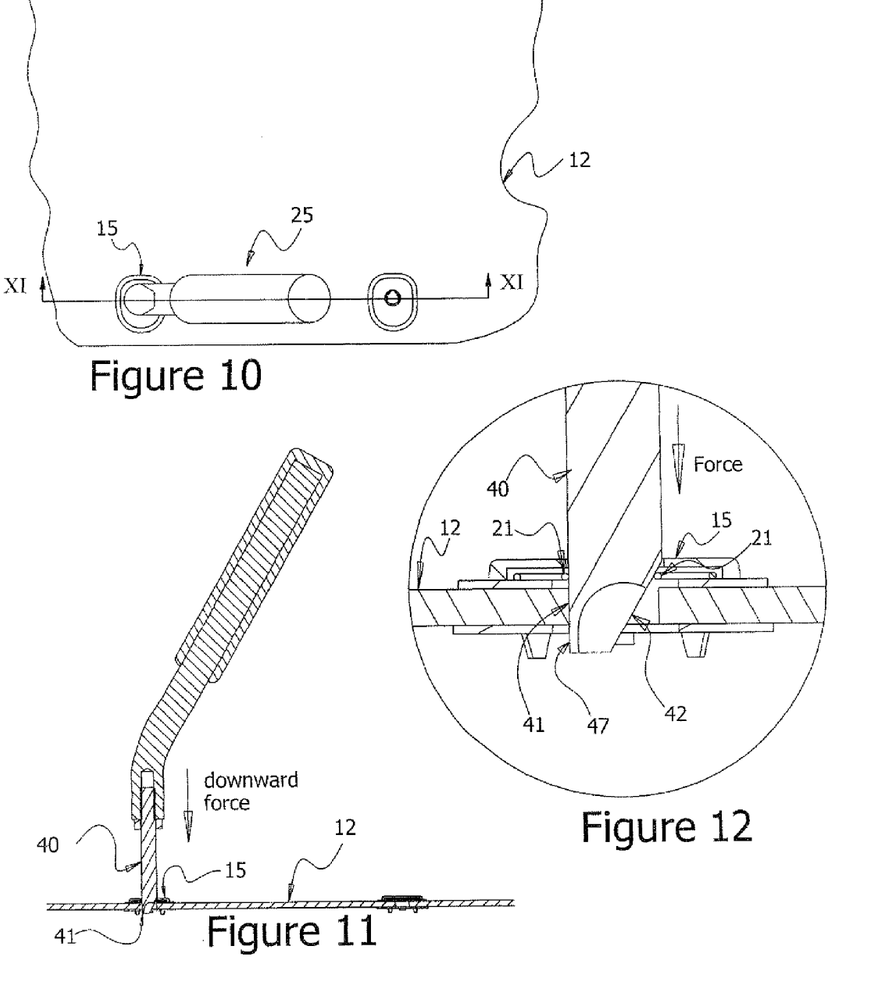
FIGS. 10-12 include a frontal cross section of the Lift the Dot® eyelet socket as the wedge-tipped shaft of the tool enters the socket and spreads the tines of the Lift the Dot® fastener's retaining spring.

The method of the invention will be explained with a first reference to FIGS. 10-12. The initial step of the method is to begin inserting the tool into the socket 15 in order to begin spreading the tines 21 apart. FIGS. 10-12 illustrate a frontal cross section of the Lift the Dot® eyelet socket as the wedge-shaped tip 41 enters the socket 15 and spreads apart the tines 21 of the Lift the Dot® fastener's retaining spring 20. The downward force and movement of the shaft 40 allows the sloped surface 42 of the wedge-shaped tip 41 to increasingly spread the tines 21 apart. See FIG. 12.

The downward action of the wedge-shaped tip 41 initially enters the eyelet socket 15 with a narrowest distal end of the tip 41. The wedge defined by the sloped surface 42 serves to spread apart the tines 21 of the spring 20 as the wedge-shaped tip 41 gradually moves further into the eyelet socket 15.

Figure 13:
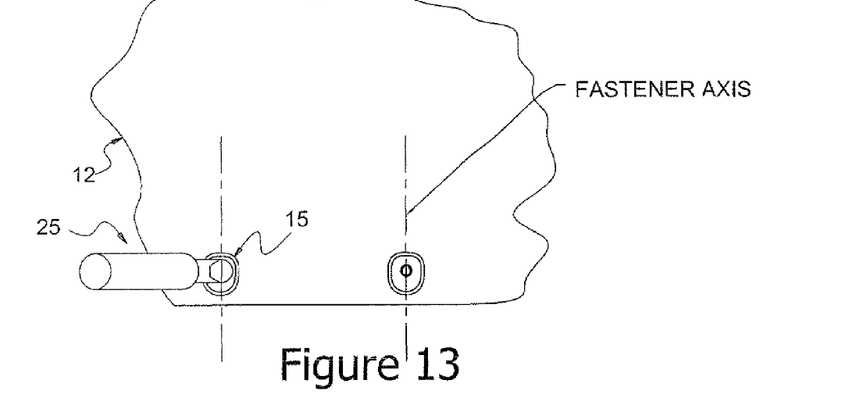
FIGS. 13-15 include a cross section of the tool showing full insertion of the wedge-tipped shaft into the eyelet socket of the Lift the Dot® fastener, with the wedge plane turned 90° to the horizontal axis of the fastener.
Figures 14, 15:
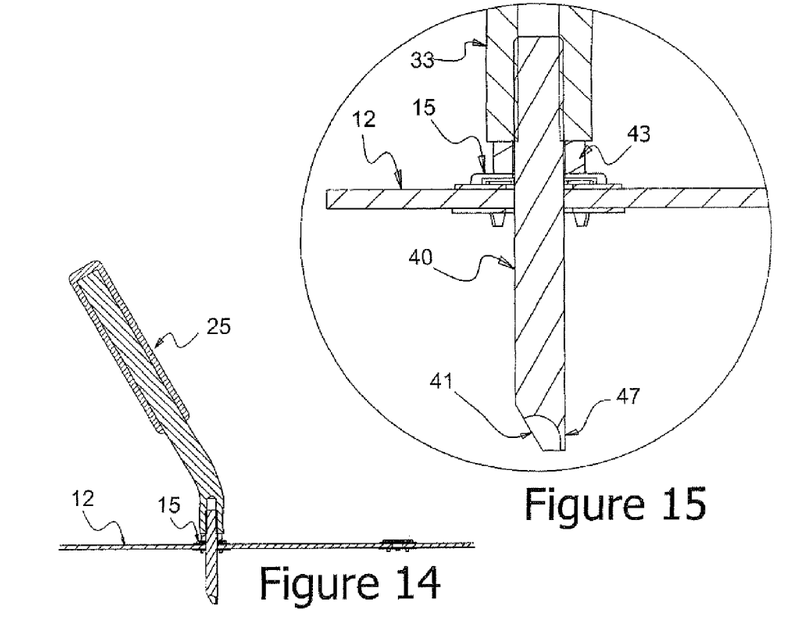

Once the tines 21 are fully spread apart, the shaft 40 is able to be fully inserted and then rotated 90 degrees within the eyelet socket as shown in FIGS. 13-15. See that the jam nut 43 may bear against the socket 15.

Figures 16, 17:
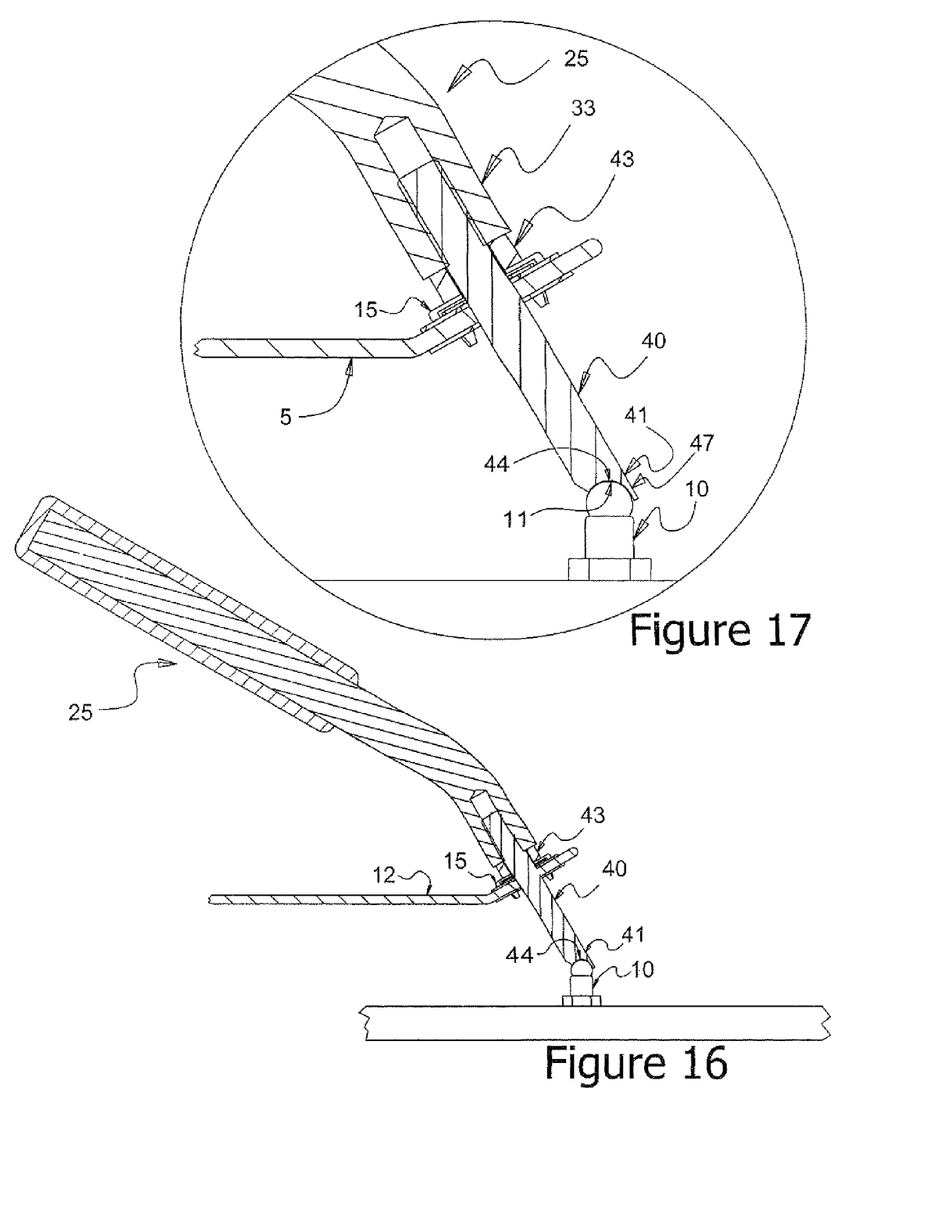
FIGS. 16-17 illustrate a cross section of the tool showing full insertion of the wedge-tipped shaft into the eyelet socket of the Lift the Dot® fastener installed in the edge of a canvas fabric. In addition, the semi-spherical concave cavity of the tip of the tool is shown making concentric contact with the spherical tip of a Lift the Dot® stud in preparation for stretching the canvas fabric.

FIGS. 16-17 show a further step of the method with the initial engagement of the wedge-shaped tip 41 bearing against the convex spherical tip 11 of the Lift the Dot® stud 10. As shown in FIG. 17, the concave cavity 44 of the wedge-shaped tip 41 mates with the stud tip 11.

Figures 18, 19:
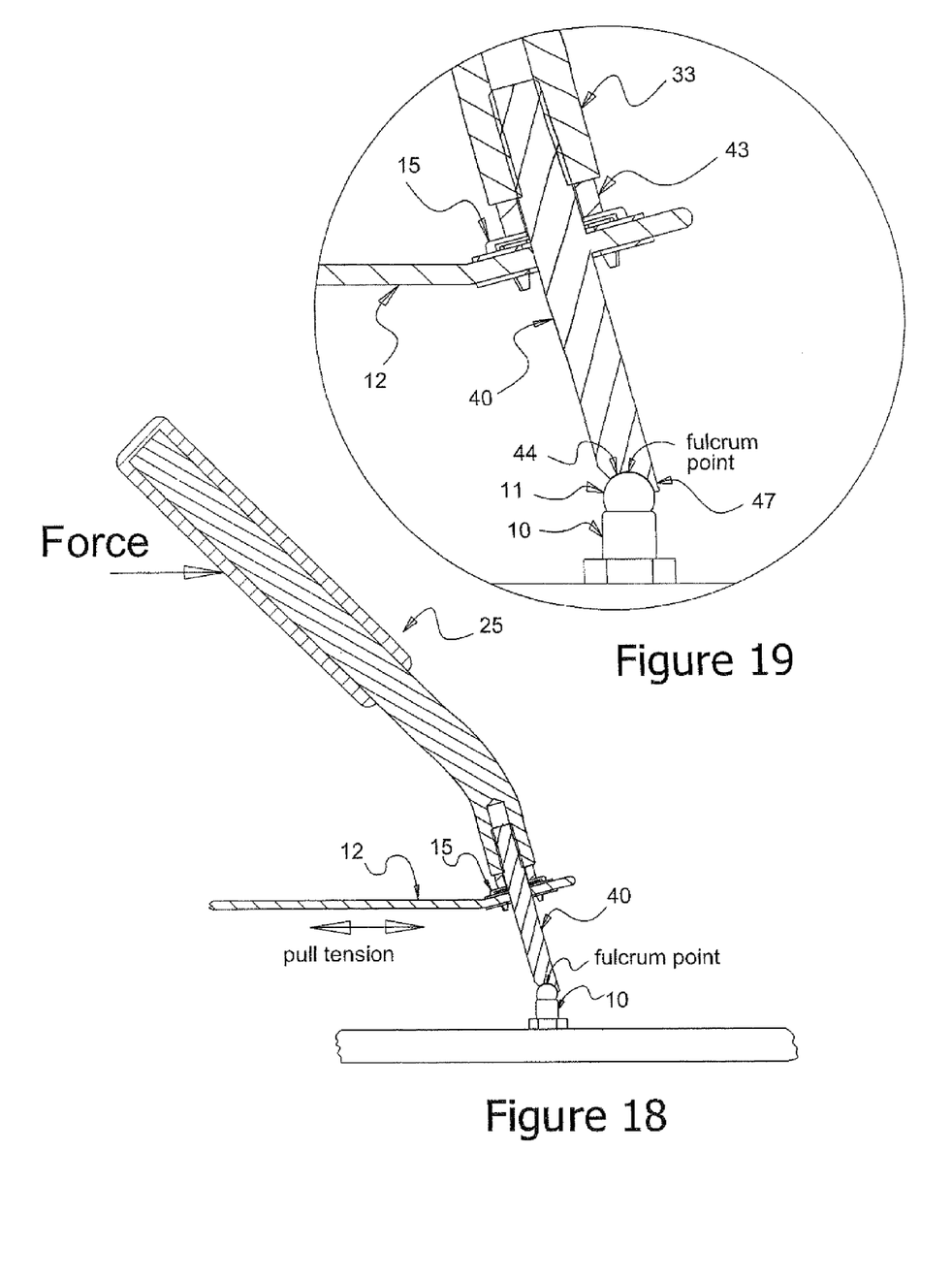
FIGS. 18-19 illustrate a cross section of the tool showing force applied to the handle during the action of stretching the canvas fabric.

In a next step, as illustrated by FIGS. 18-19, applying the illustrated force provides a pull tension on the fabric 12 by using the Lift the Dot® stud 10 as a fulcrum point. The force is applied to the handle of the invention in the direction as shown in FIG. 18.

Figures 20, 21:
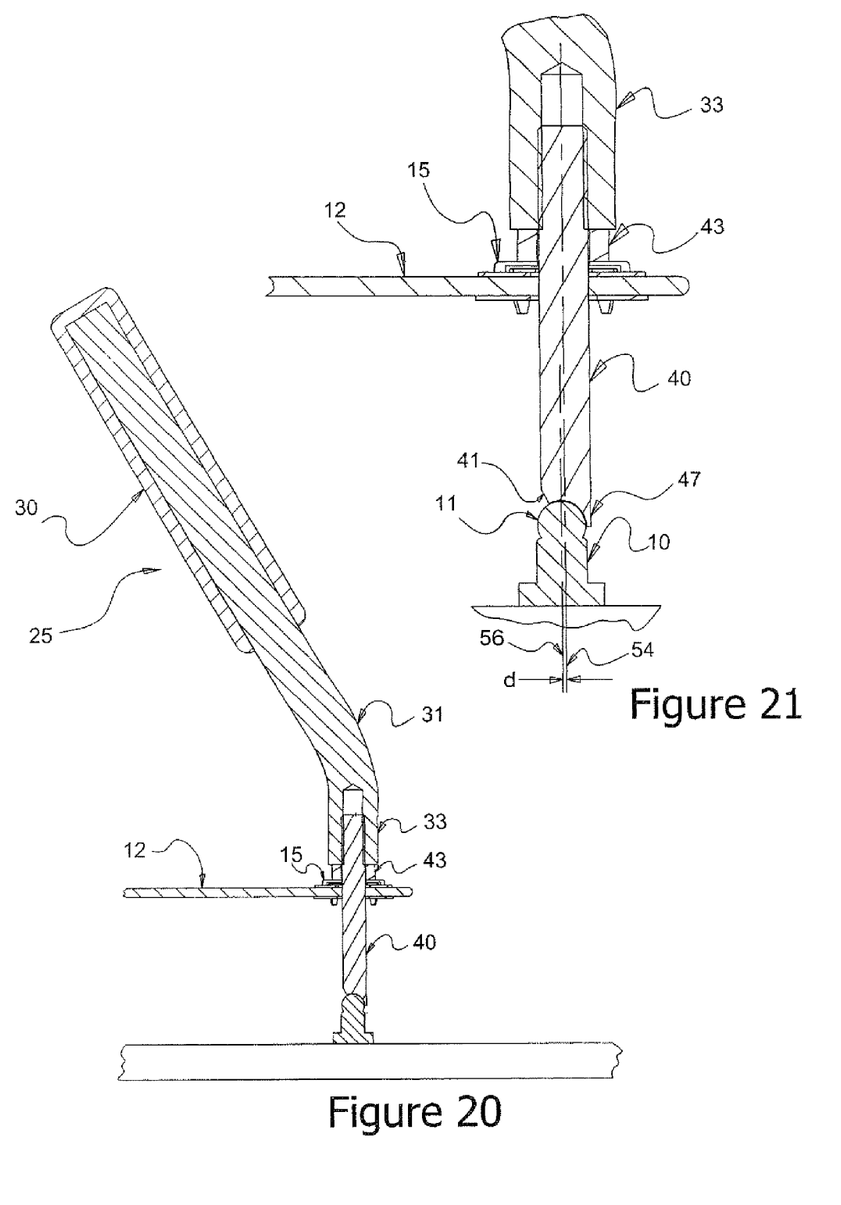
FIG. 20-21 illustrate a cross section of the tool showing the axis of the handle aligned with the axis of the Lift the Dot® stud as maximum stretching of the canvas is achieved.

FIGS. 20-21 show the results of a further step of aligning the tool 25 while further stretching the fabric 12 so that the cylindrical axis 54 of the shaft 40 is in parallel alignment with a central vertical axis 56 of the Lift the Dot® stud 10. The central vertical axis 56 is spaced from the cylindrical axis 54 by distance d in the horizontal direction away from the end portion 47.

Figure 22:
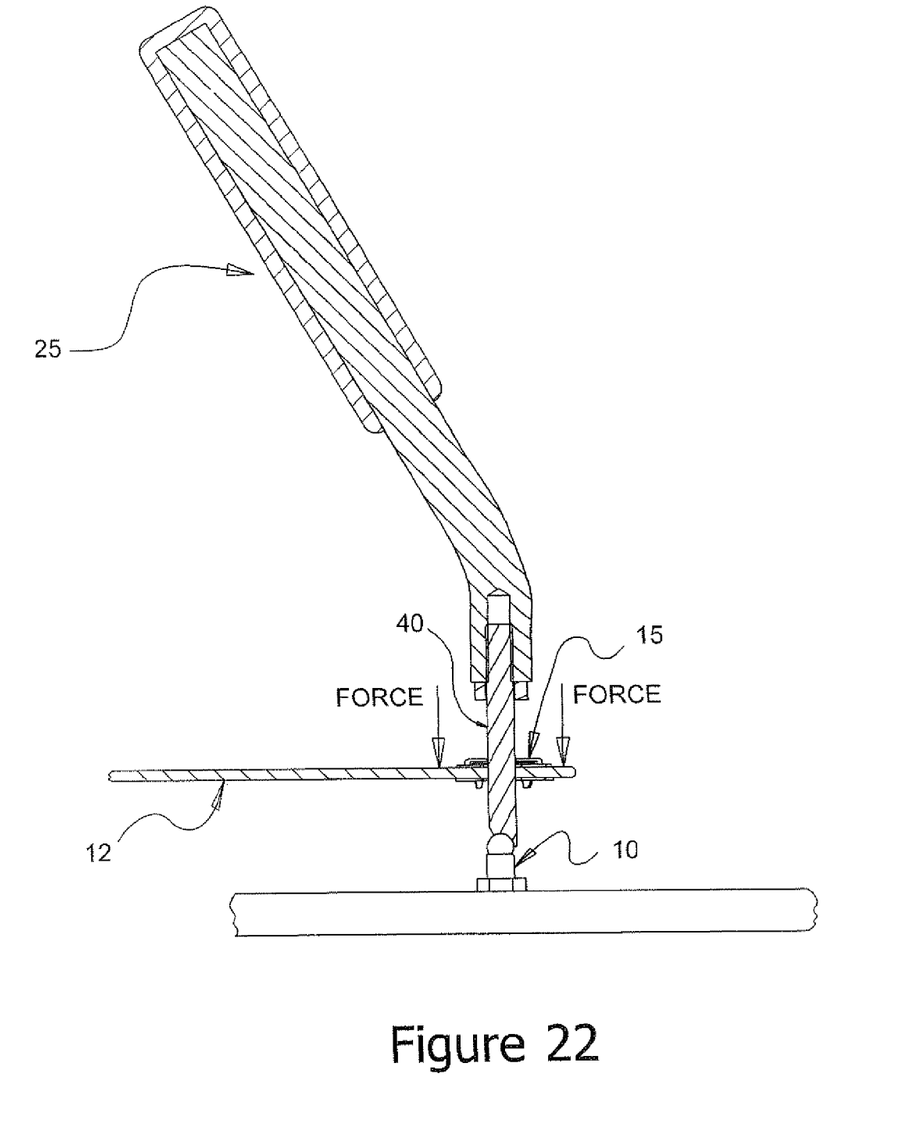
FIG. 22 illustrates a cross section of the tool showing the Lift the Dot® eyelet socket being pushed down the wedge-tipped shaft prior to final engagement with the aligned stud.

A still further step of the method is illustrated by FIG. 22. The illustrated downward force against the fabric 12 provides a final movement of the Lift the Dot® eyelet socket 15 downwardly over the tool shaft 40 and towards the Lift the Dot® stud 10.

Figures 23, 24:
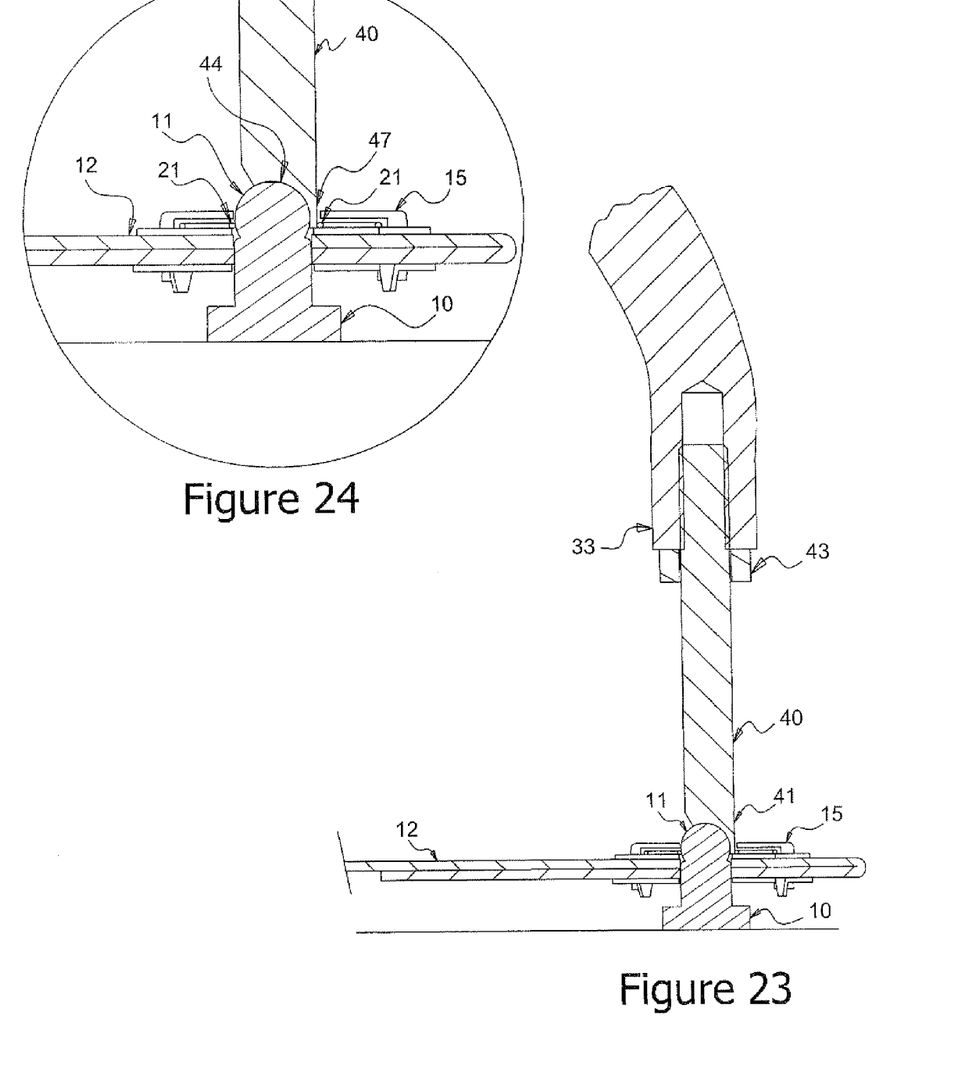
FIGS. 23-24 illustrate a cross section of the tool showing the Lift the Dot® eyelet socket in position over the aligned stud for final engagement, just prior to removal of the wedge-tipped shaft from the from the Lift the Dot® fastener assembly, the tines of the retaining spring still at least partially spread apart by the wedge-tipped shaft.

FIGS. 23-24 illustrate the socket 15 having been placed in position over the stud 10, having traveled down the length of the wedge-tipped shaft 40 and over the top of the spherical tip 11 of the stud 10 and over the end portion 47 of the wedge-shaped tip 41 as a result of the force in FIG. 22. As illustrated, the tines 21 of the socket 15 remain partially spread apart by the end portion 47 of the wedge-shaped tip 41, the distal-most end of the end portion 47 being just above the final, locking position of the socket 15 over the stud 10.

Figure 25:
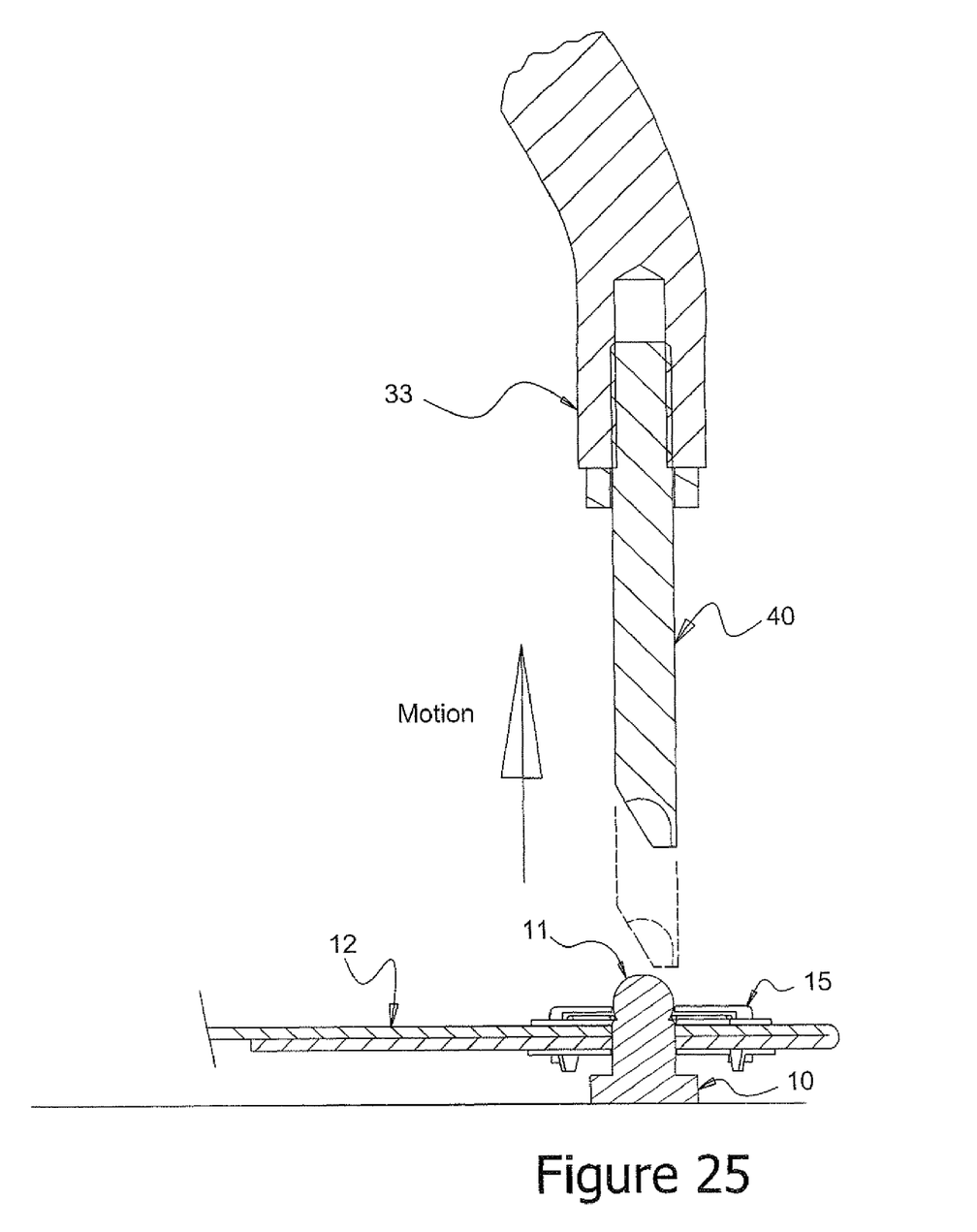
FIG. 25 illustrates a cross section of the tool showing removal of the wedge-tipped shaft from the Lift the Dot® fastener assembly, the eyelet socket in a final position fastened to the mating stud.

The final steps of the method are illustrated in FIG. 25 where the tines 21 engage with a necking portion where the spherical tip 11 meets the stud 10 to lock the socket 15 onto the stud 10, and the tool 25 is moved away from the thus-locked socket and stud by simply motioning the tool 25 away in the direction shown in FIG. 25.

The invention claimed is:

1. A socket alignment and fabric stretching tool (25), comprising:
   a handle (30) having a first end (32) and a second end (33);
   a shaft (40) secured to the second end (33) of the handle (30);
   a jam nut (43) securing the shaft (40) to the second end (33) of the handle (30);
   a wedge-shaped tip (41) located at a distal end of the shaft;
   a sloped surface (42) defined on the wedge-shaped tip (41); and
   a semi-spherical concave cavity (44) formed in the sloped surface (42) of the wedge-shaped tip (41).

2. The tool of claim 1, wherein,
   the semi-spherical concave cavity (44) matches a shape of a convex spherical tip of a fastener stud.

3. The tool of claim 1, wherein,
   wherein the handle is straight and free of bends,
   the shaft is a cylindrical shaft, and
   the shaft further comprises a threaded section threaded into a corresponding threaded section of the second end of the handle with the jam nut locking the shaft to the second end of the handle.

4. The tool of claim 3, wherein the jam nut, in a loosened position, allows the shaft to be removed and repositioned.

5. The tool of claim 4, wherein the jam nut is a wingnut.

6. The tool of claim 1, further comprising:
a bend in the handle at a position intermediate the first and second ends and closer to the second end, wherein,
the shaft is a cylindrical shaft, and
the shaft further comprises a threaded section threaded into a corresponding threaded section of the second end of the handle with the jam nut locking the shaft to the second end of the handle.

7. The tool of claim 6, wherein the jam nut, in a loosened position, allows the shaft to be removed and repositioned.

8. The tool of claim 6, wherein,
the jam nut is a wingnut,
the jam nut, in a loosened position, allows the shaft to be removed and repositioned, and
the bend defines an angle of approximately 30 degrees.

9. The tool of claim 1, wherein an cross-sectionally flat end portion (47) of the wedge-shaped tip (41) extends a length from a side of the concave cavity (44) at a distal end of the wedge-shaped tip (41) in a direction of extension of the shaft (40).

10. A method of fastening a fastener eyelet socket, located within a fabric, to a mating fastener stud, comprising the steps of:
gripping a socket alignment and fabric stretching tool (25) comprising a handle (30) having a first end (32) and a second end (33), a shaft (40) secured to the second end (33) of the handle (30), a jam nut (43) securing the shaft (40) to the second end (33) of the handle (30), a wedge-shaped tip (41) located at a distal end of the shaft (40), a sloped surface (42) defined on the wedge-shaped tip (41), and a semi-spherical concave cavity (44) formed in the sloped surface (42) of the wedge-shaped tip (41);
inserting the shaft (40) into the fastener eyelet socket (15) located within the fabric (12) and, by the shaft insertion, begin spreading apart tines (21) of a retaining spring (20) of the socket by the wedge-shaped tip (41) entering the socket (15) and thereby spreading apart the tines (21);
fully inserting the shaft (40) into the socket so that the jam nut is proximate the socket;
after the fully inserting step, engaging the cavity (44) of the wedge-shaped tip against a convex spherical tip (11) of a stud (10) so that the cavity (44) mates with the spherical tip (11);
stretching the fabric by applying a force on the handle to provide a pull tension on the fabric (12) using the stud (10) mated with the cavity as a fulcrum point;
while stretching the fabric, aligning the tool (25) so that a position of the tool handle (30) aligns a first axis through a cylindrical center of the shaft (40) in parallel with a second axis through an axial center of the stud (10);
moving the fabric (12) and the socket (15) downwardly over the shaft (40) towards the stud (10); and
pressing the socket (15) onto the stud (10) to have the tines (21) lock the socket (15) onto the stud (10).

11. The method of claim 10, comprising the further step of:
after the pressing step, moving the tool (25) away from the thus-locked socket and stud.

12. The method of claim 10, wherein,
the socket and stud form mating components of a fastener, the stud comprising a shaft portion, the convex spherical tip, and a collar portion connecting the shaft portion to the convex spherical tip, the collar portion having a width smaller than that of the shaft portion and smaller than a maximum width of the convex spherical tip, and
the socket comprising tines configured to releasably grip the collar portion of the stud.

13. The method of claim 10, comprising the further steps of:
after the inserting step, loosening the jam nut; and
with the jam nut in a loosened position, reposition the shaft with respect to the handle.

14. The method of claim 10, wherein the pressing step presses the socket (15) over an end portion (47) of the wedge-shaped tip (41) extending over a portion of the spherical tip (11) of the stud (10).

15. A socket alignment and fabric stretching tool (25), comprising:
a handle (30) having a first end (32) and a second end (33), a cavity extending into the handle at the second end;
a shaft (40) secured to the handle (30), a partial length of the shaft (40) inserted into the cavity at the second end (33);
a wedge-shaped tip (41) located at a distal end of the shaft opposite the handle;
a sloped surface (42) defined on the wedge-shaped tip (41); and
a semi-spherical concave cavity (44) formed in the sloped surface (42) of the wedge-shaped tip (41).

16. The tool of claim 15, wherein the handle (30) comprises a first straight portion extending from the first end along a first axis, a second straight portion extending from the second end along a second axis, the first and second straight portions meeting at a bent portion at a position intermediate the first and second ends and closer to the second end, the first and second straight portions forming an acute angle at the bent portion with respect to the first and second axes.

17. The tool of claim 16, wherein the shaft (40) at the distal end has a thickness configured such that the distal end is receivable through an eyelet socket portion of a fabric fastener arranged for securing a fabric connected thereto to a stud.

18. The tool of claim 15, wherein the shaft is removably secured to the handle.

19. The tool of claim 18, further comprising:
a wingnut (46) located where the shaft (40) enters the second end (33) of the handle (30),
wherein the wingnut (46), in a tightened mode upon the second end (33) of the handle (30), secures the shaft (40) to the handle (30), and in a loosened mode, frees the shaft (40) to be removed from the handle (30) and repositioned.

* * * * *